United States Patent [19]
Fischler

[11] 4,187,265
[45] Feb. 5, 1980

[54] METHOD OF MAKING ORNAMENTAL PLASTIC PRODUCT

[75] Inventor: Daniel A. Fischler, Dix Hills, N.Y.

[73] Assignee: Emsig Manufacturing Corp., New York, N.Y.

[21] Appl. No.: 577,240

[22] Filed: May 14, 1975

Related U.S. Application Data

[63] Continuation of Ser. No. 184,594, Sep. 28, 1971, abandoned, which is a continuation-in-part of Ser. No. 849,429, Aug. 12, 1969, abandoned.

[51] Int. Cl.² .............................................. B29D 3/02
[52] U.S. Cl. ...................................... 264/22; 264/108
[58] Field of Search ............................ 264/22, 24, 108

[56] References Cited
U.S. PATENT DOCUMENTS

| | | | |
|---|---|---|---|
| 3,046,610 | 7/1962 | Grunin | 204/159.23 |
| 3,398,216 | 8/1968 | Petry | 264/108 X |
| 3,518,333 | 6/1970 | Adey | 264/108 X |
| 3,592,882 | 7/1971 | Morita | 264/108 X |
| 3,658,620 | 4/1972 | Hall | 264/22 X |

*Primary Examiner*—Jan H. Silbaugh
*Attorney, Agent, or Firm*—Mark T. Basseches; Paula T. Basseches

[57] ABSTRACT

The method of making an improved ornamental plastic product incorporating lamellar material oriented in a selected disposition, which includes the steps of subjecting the resinous mass containing the lamellae to an orienting influence, and thereafter subjecting the mass to a high speed beam of electrons sufficient at least partially to cure the resin and immobilize the oriented lamellae to prevent their migration from the selected disposition. The resinous mass containing the lamellae is preferably cooled prior to orientation, and irradiated while still in the cooled state.

2 Claims, 4 Drawing Figures

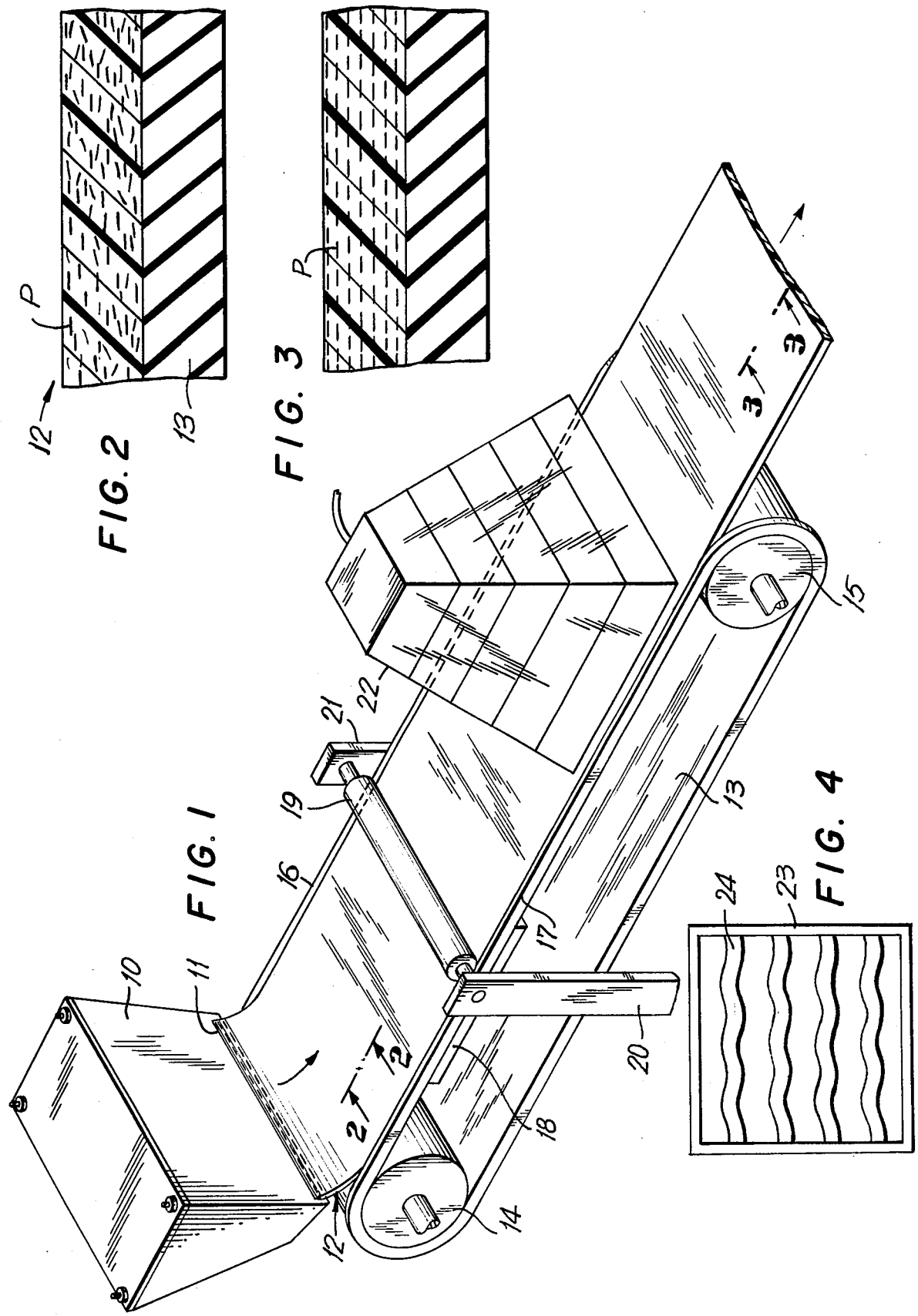

METHOD OF MAKING ORNAMENTAL PLASTIC PRODUCT

This is a continuation, of application Ser. No. 184,594, filed Sept. 28, 1971, which in turn is a continuation-in-part of Ser. No. 849,429, filed Aug. 12, 1969, both now abandoned.

BACKGROUND OF THE INVENTION

1. Field of the Invention

This invention deals with the formation of plastic materials and, more particularly, is in the field of forming plastic components such as decorative plastic sheets which incorporate lamellae. Still more particularly, this invention is in the field of plastics incorporating lamellae, such as nacreous lamellar material of the type which, in order to impart to the plastic a decorative appearance or effect, must be aligned in a particular manner, normally with the broad faces of the nacreous crystals paralleling the surface of the plastic material which is to be viewed.

2. The Prior Art

It is known to provide plastic materials having simulated pearl or mother-of-pearl effects by incorporating within a transparent plastic mass, a nacreous material, such as fish scales, basic lead carbonate crystals or the like. The fish scales or lead carbonate crystals comprise generally flake-like lamellae which, when disposed in random orientation within the plastic menstruum, give no special pearly or decorative effect.

It is further known that when the flake-like materials are oriented with their broad surfaces perpendicular to the angle at which the plastic is to be observed, the plastic takes on a sheen or luster reminiscent of pearl or mother-of-pearl.

The effect is not limited to the production of a pearly appearance since it is known that other flake-like additives, such as silica flakes, aluminum flakes, etc., when their broad surfaces are aligned with the surface of the plastic material or oriented in some other desired selected manner, will enhance the appearance of the plastic.

Numerous means have been suggested for inducing the desired orientation of the lamellae within the liquid plastic mass. Such orientation methods include flowing the plastic mass across a stationary surface or along the inner surface of a rotating drum, extruding the plastic, wiping the surface of the plastic as with a roller, and variations of the foregoing. Other means, such as the creation of electrostatic fields, have been employed for achieving the desired disposition of the particles.

While all of the foregoing methods of orientation are generally satisfactory in that a selected orientation is achieved in the liquid state, great difficulty has heretofore been experienced in obtaining a finished plastic product in which the nacreous flakes are captured in the optimum position achieved during the orienting step.

I have determined that part of the difficulty in prior methods for making ornamented plastics of this sort lies in the fact that the curing steps heretofore employed in such methods have the inherent drawback of disorienting the nacreous material. Where heat is employed as the curative step, turbulence created by the heat and reduction of viscosity upon application of heat result in transfer of the material from its optimum oriented position.

Where the material is oriented by flowing into glass cells, for instance, the gravitational effect and Brownian movement produce significant modfications of the pearl position.

SUMMARY OF THE INVENTION

The present invention relates to a method of manufacturing plastics containing oriented lamellae, such as natural or synthetic nacreous materials, aluminum, silica or like flake materials, which comprises the steps of inducing a desired orientation of the lamellae material within the plastic mass and, in advance of significant disorientation, subjecting the resinous material to a high speed electron beam of a value sufficient to cure the resinous material at least to a stage at which the pearly material is immobilized.

I have discovered that, for reasons which are not entirely understood, the electron curing method freezes the plastic to immobilize the pearl without significant disorientation of the pearl. Accordingly, through the use of the electron beam curing method, there may be obtained plastic products, and particularly plastic sheet material having decorative pearly effects, which approach the optimum degree of desired orientation. As a result of such method, it is possible to reduce the pearl concentration or to obtain enhanced pearly effects, given equal pearl concentrations, as contrasted with methods heretofore known.

Preferably the pearl-resin mix is cooled prior to orientation and irradiation, whereby maximum orientation is achieved with minimal application of orienting influences. Uniquely in accordance with the present process, there is no substantial drop in viscosity in the course of polymerization and, hence, such difficult techniques as prepolymerization of the resin to high viscosities need not be undertaken.

The method provides for rapid production and admits of the production of an intermediate material having a long shelf life and susceptible of being stored in a leathery or flaccid condition in which the material may be subsequently shaped, punched, blanked or otherwise treated before final cure.

Accordingly, it is an object of the invention to provide an improved method of manufacturing a decorative plastic article containing orintable material, such as light reflecting material, i.e. synthetic or natural pearl, aluminum or silicon flakes or like materials which, unlike magnetically responsive compositions, are not subject to being fixed in position during polymerization by external magnetic fields.

It is a further object of the invention to provide a method of the type described in which the finished or intermediate plastic product with the pearlescent material fixed in a desired orientation is produced rapidly.

Still a further object of this invention is the provision of a process for producing pearlescent or like effects in a plastic mass which includes cooling the composite resin mix, subjecting the same to orienting influences, and irradiating the oriented mass while the latter is still in a cooled state.

To attain these objects and such further objects as may appear herein or be hereinafter pointed out, I make reference to the accompanying drawings, forming a part hereof, in which:

FIG. 1 is a diagrammatic view of an apparatus for carrying out the method of the present invention;

FIG. 2 is a magnified section taken on the line 2—2 of FIG. 1;

FIG. 3 is a magnified section taken on the line 3—3 of FIG. 1;

FIG. 4 is a plan view of a shield member to enable the production of a plastic sheet having an orientation pattern formed thereon.

Referring now to the drawings, there is diagrammatically shown at 10 a hopper or container for a liquid resinous mix containing orientable lamellar material, such as lead carbonate crystals or the like. The hopper 10, which is preferably maintained under a super-atmospheric pressure, includes an extrusion slot 11 through which a veil, train or band 12 of the material may be extruded onto a continuously moving conveyor belt 13.

In the diagrammatic illustrations, the conveyor belt is supported on a pair of spaced drive and idler rolls 14, 15, respectively, the belt 13 being preferably formed of a Teflon (T.M.) coated material. The belt 13 is formed with rims or beads 16, 17 at the marginal edges thereof, to provide a trough-like configuration.

A support plate 18 is disposed beneath the belt at an intermediate area, an orientation roller 19 being vertically adjustably mounted for movement toward and away from the belt. The roller 19 is supported on side frame elements 20, 21 for rotation about a horizontal axis. It will be understood that the elements 20, 21 may be adjusted vertically so as to lower the roller into contact with the resinous mixture 12 extruded onto the conveyor belt from the hopper 10.

It will be noted that the roller 19 is disposed above the plate 18 and that the thickness of the plastic layer or film in the area downstream of the roller will be determined by the spacing of the roller from the support plate 18 across which the belt 13 is scanned.

Preferably the roller 19 is provided with a fluorocarbon coating, such as Teflon (TM), to prevent any of the viscous plastic material from sticking to the roller.

It will be appreciated that the roller 19 engages against the top surface of the plastic resinous mass, creating a turbulence in a direction generally parallel to the surface of the plastic mass, thus inducing an orientation of the pearly material within the liquid plastic mix. The turbulence causes the flakes or lamellae to become aligned parallel with the upper and lower surfaces of the resin as it is disposed on the belt.

It will be appreciated from FIG. 2 that a partial orientation of the pearly lamellae P is achieved by the laminar flow inherent in the extrusion of the veil of the plastic material from the hopper 10 and that such orientation is perfected by the roller 19, it being understood that a multiplicity of rolling steps may be employed for such purpose.

It will be further understood that a doctor blade or blades or similar orientation flow inducing apparatus may be substituted for the roller.

The plastic material downstream of the roller 19 is passed beneath a high speed electron beam generator 22 at a rate calculated to cause the resinous material to polymerize or cure at least to a degree which will immobilize the lamellae in their oriented position.

It will thus be observed that a partially polymerized sheet will emerge from the electron bombardment, the sheet having incorporated therein light reflecting or like lamellae which have been fixed within the sheet in a desired, essentially perfect orientation.

As more fully explained hereinafter, the finished sheet may be partially or fully cured, depending upon the electron dosage to which it has been subjected.

Similarly, as hereinafter more fully set forth, the material may incorporate a initiator, whereupon a partially polymerized sheet may be formed, as by blanking or bending, and thereafter cured by a conventional heating step rather than by re-exposure to the electron beam. In the last mentioned instance, since the polymerization of the resin material has been effected to the so-called "B" stage, subsequent heating steps will not result in softening of the material to any extent which would permit a migration of the oriented pearlescent material.

The method has been found particularly satisfactory in the processing of so-called polyester resins and a specific example of a polyester formulation will be described hereinafter. It should, however, be appreciated that the novelty hereof is not considered to reside in any specific selection of materials since the advantages of the present invention may be achieved through the use of any material susceptible to so-called electron curing, such materials including but not being limited to vinyl compounds, acrylics, urethanes and the like. Accordingly, the invention is to be broadly construed and not limited to any specific material or materials now known or hereinafter discovered but, rather, is to be considered to reside in the processing steps and apparatus as set forth in the appended claims.

The term "B" stage as used herein shall be deemed to mean an irreversible, partially polymerized condition in which the resinous material is coherent to the extent that the filler material is no longer mobile.

In accordance with the invention, a polyester system suitable for processing is exemplified as follows:

To 90 parts by weight of a rigid polyester, such as LAMINAC 4120 (T.M. of the American Cyanamid Co) there are added 10 parts by weight of a flexible polyester resin, such as SELECTRON 5238 (T.M. of Pittsburgh Plate Glass Corp.)

To the above noted mixture there are added

1½ parts by weight of a 35% dispersion of basic lead carbonate flakes in a compatible polyester plasticizer. As an example of such product there may be mentioned NACROMER Z.F.L. (T.M. of Mearl Corp.)

To the above there may be added suitable amounts of ultra violet stabilizer to prevent yellowing, as well as colorants.

The mixture is extruded from the hopper 10 to define a layer on the belt 13 which is about 10 to 20% thicker than the sheet desired. The orienting roller 19 distributes the material to the desired thickness as well as completing the orientation which was partially effected by the initial extrusion process, as previously set forth.

As is known in the art, for most efficient utilization of the capacity of the electron beam generator, the beam energy which determines the penetrating power of the beam should be adjusted so as to be just sufficient to penetrate the thickness of the layer to be fabricated. The beam energy for a polyester system may be determined in accordance with the following table:

| Thickness (inches) | Beam Energy (M.E.V.) |
| --- | --- |
| .015 | .3 |
| .035 | .5 |
| .070 | 1.0 |
| .250 | 2.0 |

Industrial electron accelerators suitable for carrying out the present invention are commercially available from Radiation Dynamics Inc., Westbury Industrial Park, Westbury, Long Island, New York.

It has been further determined that the dosage in rads required to polymerize polyester systems to the "B" stage is from about 1 to about 3 megarads. The variation of from about 1 to about 3 megarads takes into account the different dosage requirements of various polyester systems, together with the wide range of hardnesses encompassed within the term "B" stage, as herein defined.

Further, polyester resins will vary somewhat from batch to batch and if the degree of hardness is critical for subsequent fabricating steps, minor variations in dosage may be determined by simple trial and error procedures.

The dosage required to effect a complete cure of a polyester system will vary from about 5 to about 10 megarads. The dosage will vary from material to material. In the processing of acrylics, for instance, the dosage requirements above noted for polyester systems may be halved, 2½ to about 5 megarads being sufficient to effect a complete cure.

The rate of output of which the system is capable obviously will be determined by the capacity of the electron beam generator. An empirical formula developed to determine output is as follows:

$$\text{Rate of output} = \frac{15 \text{ sq. ft. per minute} \times \text{milliamp output of electron generator}}{\text{megarad dosage required for desired cure}}.$$

Thus, assuming a capacity of 5.0 milliamps and a dosage of 2 megarads, an output of approximately 37.5 square feet per minute is anticipated. Accordingly, if the beam width and the width of the polyester resin material are, for example, one foot, it will be evident that the linear speed of the polyester along the conveyor beyond the orienting roller 19 is 37½ feet per minute or about 0.62 feet per second.

From the noted linear speed it will be observed that, depending upon the spacing of the last orienting roller from the curing area, only a very short period of time, in the area of a few seconds, will elapse from the final rolling step to the curing step, providing very limited time for any possible disorientation of the pearlescent crystals.

Preferably, the plastic mass containing the pearl material is cooled just prior to extrusion substantially to increase the viscosity thereof. By way of example, and without limitation as to any figure or range, I have determined that the polyester material which is described herein is desirably cooled to increase the viscosity to about 800,000 centipoises. The viscosity can be less where the heat output of the irradiating apparatus is low or greater where there is high heat output. Where adequate cooling facilities exist for the irradiating apparatus so that the resin is not subjected to heat, no increase in viscosity is necessary.

The increased viscosity permits more efficient and complete orientation, with the application of less orienting forces, and reduces the tendency toward disorientation present in a less viscous mass.

Cooling the resin has the further desirable effect of preventing surface disorientation in instances where the irradiating apparatus may generate substantial incidental heat, and may thus result in some slight drop in surface viscosity prior to irradiation. Altho by no means critical, cooling to about 7° C. has been found satisfactory in an irradiating unit developing fairly substantial heat.

In the present process, once the resin has been subjected to irradiation, there is no significant viscosity drop. In contrast, in all other known polymerization methods, whether or not involving external heat sources, a substantial viscosity drop is experienced before the resin reaches "B" stage, due to the exothermic nature of the polymerization reaction.

The flaccid or "B" stage plastic sheet resulting from the above noted example exhibits a beautiful pearly appearance. Moreover, the sheet has extended shelf life without exhibiting further polymerization, due to the absence of catalysts, promoters and like reagents. The sheet may be stored for subsequent punching, bending and forming operations, whereupon the cure of the finished products may be completed by further exposure to the electron beam.

In accordance with a modification of the procedure, ½ to ¼% benzoyl peroxide initiator may be added to the resin mixture in the hopper 10. The mixture may thereafter be processed to the "B" stage in the manner set forth above. The shelf life of such "B" staged material will be somewhat shorter than the initiator-free formula. However, this material may be cured to the hardened, infusible stage by conventional heating techniques and requires no further electron curing.

As noted previously, the method and apparatus of the present invention are not limited in their usefulness to polyesters or to thermo-setting resins generally. Rather, the method and apparatus may be used to process any resinous material which hardens or may be modified to harden, cure or polymerize upon exposure to high speed electron beams and wherein it is desired to induce such hardening in order to fix the orientation within the resinous mass of light reflecting or other particles which are susceptible of being oriented.

In FIG. 4 there is shown by way of example a mask 23 which may be used to provide special effects in the orientation of the pearl. The material is processed in the manner above described, with the mask between the electron beam generator and the material. The mask includes wavy metallic cross elements 24 which, in the applied position of the mask, are disposed longitudinally of the moving resin stream.

It will be appreciated that by reason of the shielding effects of the elements 24, portions of the resinous material directly exposed to the electron beam will be fixed in their oriented position since the exposed material will be partially or fully polymerized, depending on dosage, whereas the plastic material in the shielded portions will remain in its essentially viscous, flowable condition. Increments of the material proceeding beyond the electron beam generator 22 are placed on pans or like support mechanisms having retaining walls.

After a period of time sufficient to permit disorientation in the still viscous areas, the cure of the sheet is advanced by heating or by re-exposure to the electron beam, whereupon the resultant product discloses areas of essentially perfect orientation, with interposed areas of partially interrupted or completely disoriented areas.

It will be appreciated that numerous variations within the spirit of the invention may be made, to create an almost infinite variety of orientation patterns within the plastic mass.

By using a roller having interruptions instead of a flat roller 19, for instance, it will be observed that a different degree of orientation may be achieved in the areas in which the roller periphery touches the plastic of the resinous mass than in those areas of the resin sheet cleared by the roller.

Similarly, reciprocating rotary, or random moving fingers may be dipped into the resinous mass before or after the orienting roller, tracing patterns through the material being processed. After electron beam polymerization, the resultant sheet (whether "B" stages or finally cured) will present a wavy pattern orientation as opposed to the essentially homogeneous parallel orientation produced by the use of the illustrated apparatus.

Accordingly, and in view of the variety of effects which are made possible through the use of the present invention, the term "orientation" as used herein shall not be limited to an arrangement of the nacreous material parallel to the major surfaces of the sheet or other shape or type of article processed but, rather, shall be more broadly interpreted as relating to any controlled disposition of the particles, to achieve desired effects.

Further, while the apparatus and method of the present invention have been illustrated in connection with electron beam processing of a continuous sheet advanced by a conveyor, it will be observed that the resinous material need not be in sheet form and that other means beside a conveyor may be employed in advancing the resinous mass through the electron beam station. By way of example, the material may be arranged on or within a centrifugal casting device and subjected to irradiation during the centrifugal casting step. Also, the resinous mixture may be poured into pans and combed or otherwise processed, i.e. electrostatically, to secure orientation, whereupon the pans containing the resin having the oriented lamellae therein may be subjected to the electron beam.

Also, the electron beam may be arranged to move relative to a stationary or moving carrier of the resinous material.

Accordingly, it will be evident from the above that there is disclosed herein a novel method of processing liquid resinous materials containing orientable filler materials which permits the filler materials to be fixed within the plastic mass in any selected orientation achieved by any known orienting method.

It will be further appreciated that the apparatus of the present invention includes, in combination, means for orienting and means for fixing the orientation, the last named means comprising a high speed electron beam source capable of rapidly fixing the position within the resinous mass of previously oriented nacreous or other particles.

The method and apparatus of the present invention may be readily adapted to a wide variety of plastics and filler materials.

Accordingly, the invention should be broadly construed within the scope of the appended claims.

Having thus described the invention and illustrated its use, what is claimed as new and is desired to be secured by Letters Patent is:

1. The method of manufacturing a formed plastic article having oriented laminar, non-magnetic filler material disposed therein from a batch of liquid resinous material of a type which exhibits an exothermic reaction upon polymerization and which is subject to polymerization responsive to a high speed electron beam, which comprises the steps of introducing said filler material into said resin batch, subjecting said filled resin batch to orienting influences to cause said filler to assume a desired orientation within said batch, terminating application of said influence, and thereafter, while said filler remains oriented, subjecting said batch to a source of high speed electrons in dosage sufficient partially to polymerize the treated portions of said batch throughout the thickness thereof substantially to the "B" stage, thereby to fix the position of said filler in said desired orientation relative to said polymerized material, thereafter forming said material while in the "B" stage, and thereafter completing the cure of the formed material.

2. The method of claim 1 and including the step of cooling said filled resin batch prior to said orienting and irradiating steps.

* * * * *